United States Patent [19]

Lewis

[11] 4,360,265
[45] Nov. 23, 1982

[54] APPARATUS FOR PRODUCING MICROFORM RECORDS FROM HARD COPY, CATHODE RAY TUBE IMAGE OR TRANSPARENCY DATA-CONTAINING SOURCES

[75] Inventor: Gary Lewis, St. Clair Shores, Mich.

[73] Assignee: Energy Conversion Devices, Inc., Troy, Mich.

[21] Appl. No.: 113,647

[22] Filed: Jan. 21, 1980

Related U.S. Application Data

[63] Continuation-in-part of Ser. No. 98,388, Nov. 29, 1979, abandoned.

[51] Int. Cl.³ .................... G03B 27/52; G03B 27/70
[52] U.S. Cl. ........................................ 355/43; 355/75
[58] Field of Search .................. 355/18, 19, 53, 54, 355/70, 75, 113, 119, 43

[56] References Cited

U.S. PATENT DOCUMENTS 3,947,112  3/1976  Hahn et al. ............... 355/70 X
3,966,317  6/1976  Wacks et al. .............. 355/19
4,080,065  3/1978  Spence-Bate .............. 355/54
4,123,157  10/1978 Klose et al. ............. 355/54 X Primary Examiner—Richard A. Wintercorn
Attorney, Agent, or Firm—Lawrence G. Norris

[57] ABSTRACT

Apparatus for producing microform records includes an image-reducing projection system positioned above a hard copy and transparency-receiving imaging station defining a horizontal document plane. An opaque platform is located at the document plane for supporting hard copy and a transparent plate is located at or near the document plane for supporting a transparency. Overhead lamps are provided to direct light downwardly upon the hard copy, and a light source, preferably a cathode ray tube, is provided below this document plane to project light upwardly through the document plane. The cathode ray tube or other light source produces a uniform light field or image-containing light field, the former when a transparency is placed at said document plane, the latter either when a transparency is or is not located at or near said document plane. When an image-containing light field is directed through a transparency at the document station, the microform record produced includes both the image in the image-containing light field and the object of the transparency as an overlay of the same.

17 Claims, 11 Drawing Figures

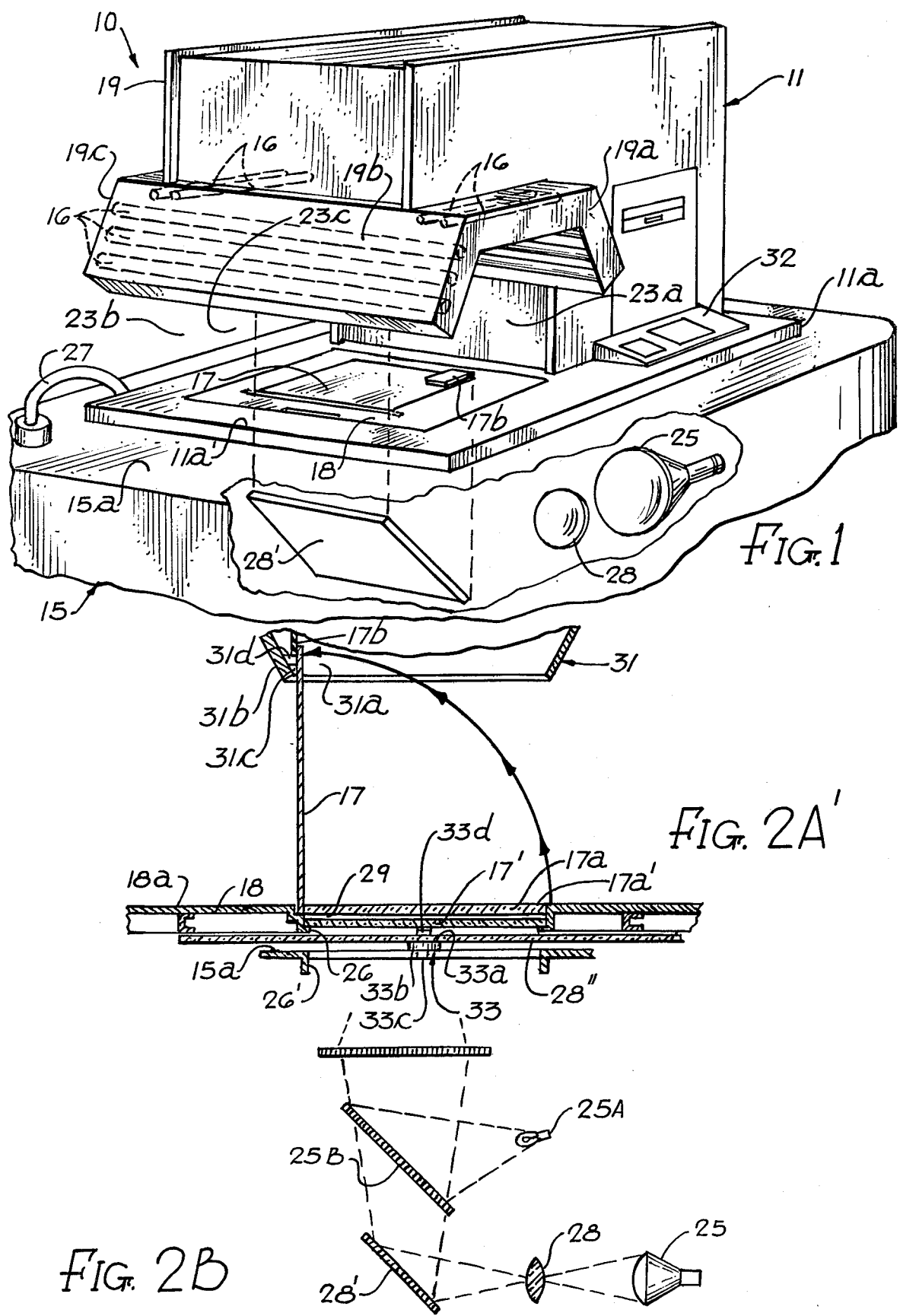

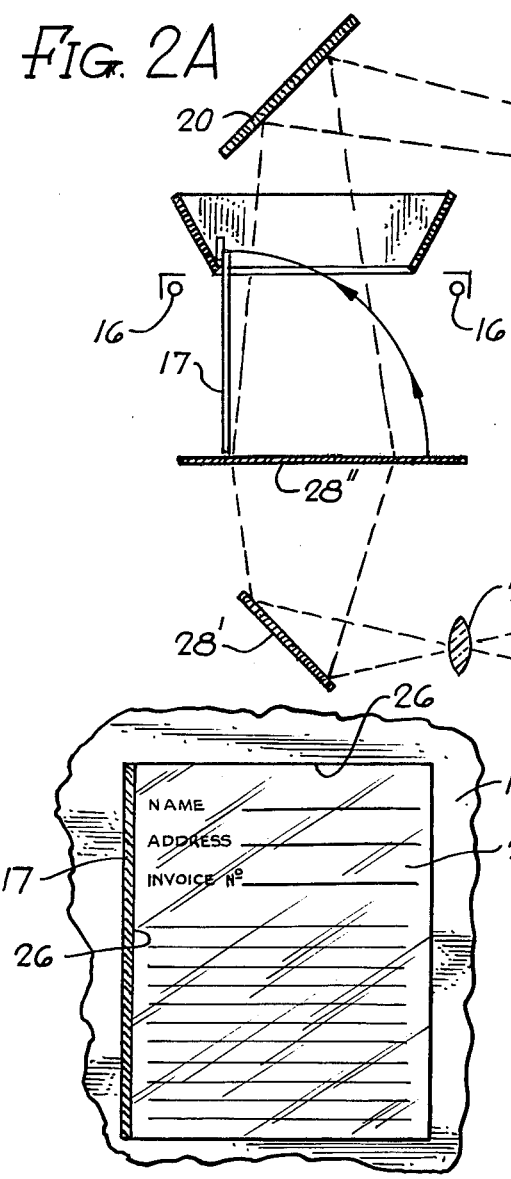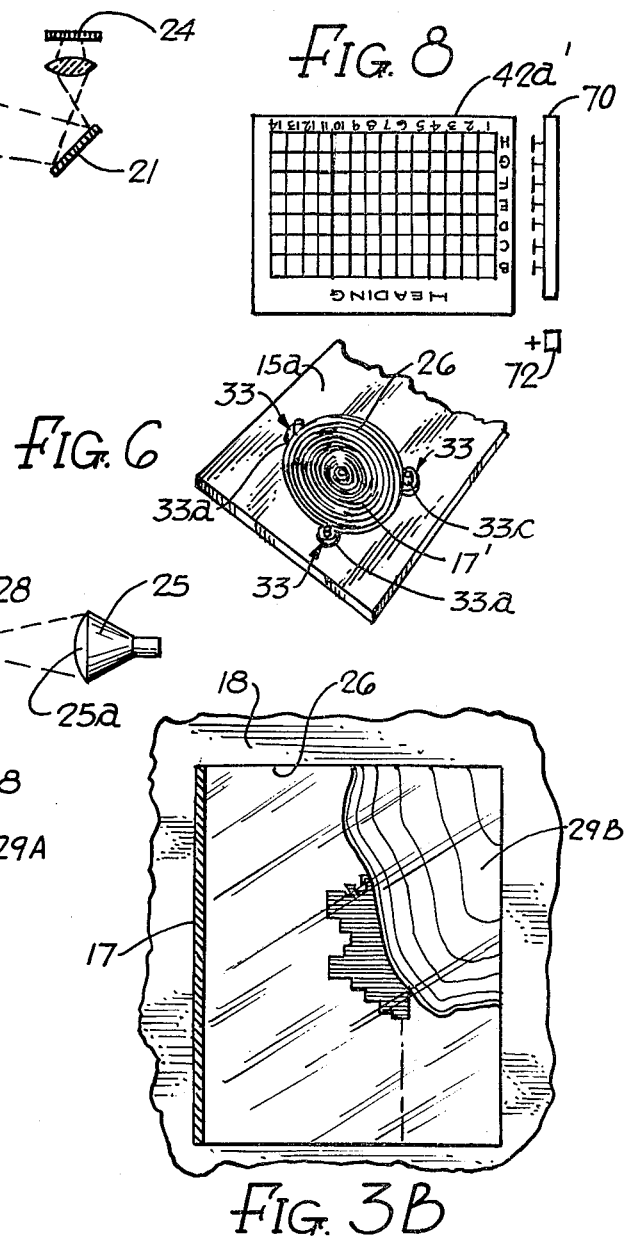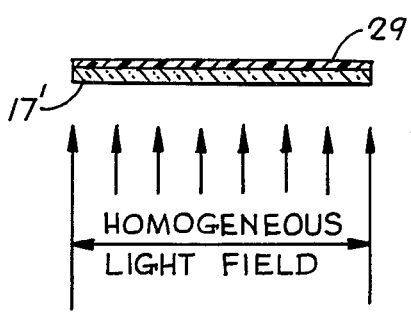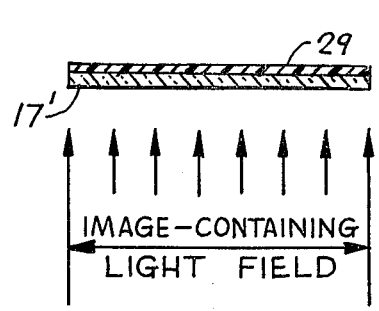

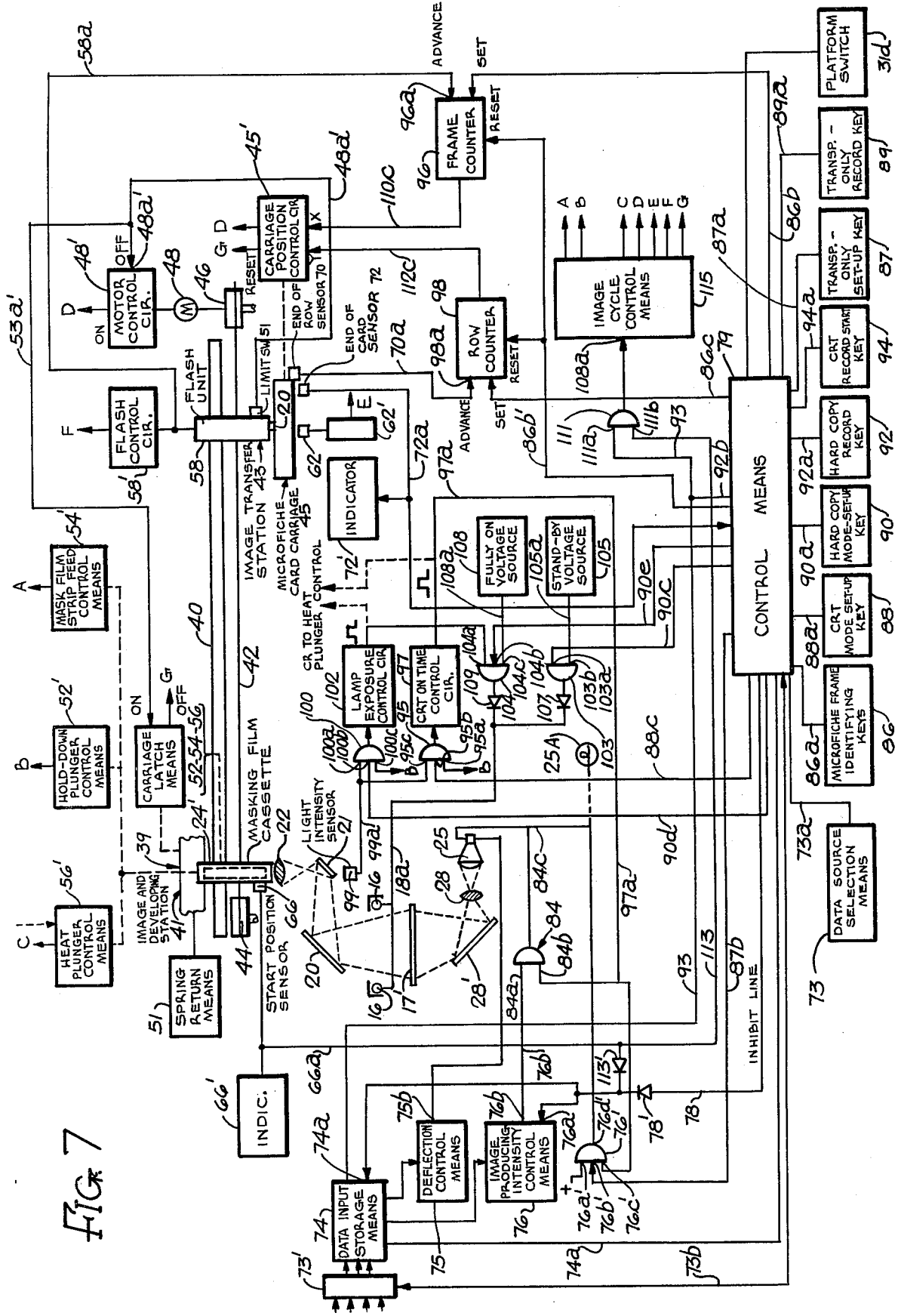

APPARATUS FOR PRODUCING MICROFORM RECORDS FROM HARD COPY, CATHODE RAY TUBE IMAGE OR TRANSPARENCY DATA-CONTAINING SOURCES

Related Application

This application is a continuation-in-part of application Ser. No. 98,388, filed on Nov. 29, 1979, and now abandoned entitled *APPARATUS FOR PRODUCING MICROFORM RECORDS FROM MULTIPLE DATA SOURCES.*

BACKGROUND OF INVENTION

The present invention in one of its preferred forms relates to a dry-process apparatus for producing archival microform records from light reflecting hard copy, such as apparatus like that disclosed in U.S. Pat. Nos. 3,966,317 and 4,123,157, but modified so that it can also produce microform records from cathode ray tube face images (hereafter sometimes referred to as CRT images) constituting pages of desired data or from transparencies, such as medical X-ray transparencies or transparency overlays to data appearing on such cathode ray tube face. The apparatus disclosed in these patents includes a document station with a horizontal, opaque, hard copy-receiving platform, and wherein a light image reflected upwardly from the hard copy on the platform is directed into an image-reducing projection system which applies the resulting reduced image to a non-archival dry-process mask-forming film strip which is very sensitive to the hard copy reflected light. The imaged portion of the film strip is developed by heat to provide micro-imaged transparencies therein where the light preferably forms a dark opaque background for the transparent data forming portion of the image produced therein. The apparatus also includes an image transferring station wherein the micro-imaged transparencies produced in the mask-forming film strip are transferred by radiant energy above a certain critical value passing therethrough to an initially opaque archival dry-process microfiche card-forming film which is not very sensitive to hard copy reflected light, but is sensitive to and rendered transparent without any development operation in those regions thereof struck by the radiant energy above the certain critical value. The final image produced is a negative of the original hard copy image and has archival properties. Since only the originally dark data portion of the original hard copy image affected the microfiche card-forming film, the film has add-on capabilities. The apparatus disclosed in said U.S. Pat. No. 4,123,157 includes features for enabling a previously partially imaged frame of the microfiche card-forming film to be moved into a projection position where the frame image is projected onto the platform so that an overlay piece of hard copy can be placed on the platform and positioned thereon to transfer data thereon to still unimaged portions of the microfiche frame involved.

It was not initially appreciated that the apparatus as disclosed in the aforesaid patents could be effectively used in recording information fed directly from cathode ray tube images. In the past, microform records have sometimes been made from computer data by using a computer data controlled laser beam scanning small areas of a recording film to provide micro-sized characters representing alpha-numeric and other data. However, laser beam scanning equipment designed for this purpose is relatively expensive, and because of OSHA restrictions are not presently useable in business offices and the like. Also, cathode ray tube images where the alpha-numeric data is directly formed by the lighted portions of the cathode ray tube screen have been reduced in size and applied to a film to form microform images thereon. The microform film used did not have add-on capabilities, and there was no particular thought given to the possible advantages of providing alpha-numeric data formed by back-lighted portions of the cathode ray tube screen which form dark alpha-numeric characters or other data, resembling hard copy images.

In co-pending application Ser. No. 98,388, filed Nov. 29, 1979, there is disclosed, among other things, a microform recording system having many features like that disclosed in said patents, and in addition includes means for directing a light image, such as a cathode ray tube image, into the same image-reducing projection system as the hard copy light reflected image is projected. In the most preferred form of this recording system, the opaque hard copy-receiving platform is mounted for movement automatically into a hard copy-receiving position below the image-reducing projection system when a hard copy record set-up control is operated. Exposure control means specifically designed for producing a properly exposed hard copy image on the dry-process mask-forming film then becomes operable to energize light sources directed upon the hard copy to produce a satisfactory image when a hard copy record control is operated. In the most preferred form of the recording system disclosed in this application, a cathode ray tube is mounted below the operative position of the hard copy-receiving platform, which is moved out of this operative position automatically when a CRT record set-up control is operated so that a cathode ray tube image can be upwardly directed into the same image-reducing projection system used for making hard copy microform records. Also, exposure control means specifically designed for use with the CRT imaging operation becomes operative when the CRT mode of operation of the apparatus is selected.

SUMMARY OF THE INVENTION

The present invention relates to an improvement in the microform recording system disclosed in this co-pending application in that it provides separately or in addition to a recording system like that disclosed therein means for forming microform records from a transparency, such as X-ray or other image transparency, which supplies the sole image to be recorded or an overlay image to another projected image like the image on the face of the cathode ray tube.

In accordance with one form of the present invention, an imaging station of the microform recording system is provided with means for supporting the transparency involved, and means for directing a light field through the transparency and into the image-reducing projection system preferably used for a hard copy reflected light image. Most preferably, the transparency-supportive means is located at the same location as the imaging station for the hard copy and, to this end, there is provided at or immediately below the document plane for the hard copy a transparent plate over which the transparency involved can be placed by the operator when the opaque hard copy-receiving platform is removed from the document plane of the hard copy imaging station. When the image on the transparency is the sole image to be recorded on the selected frame of the microfiche card-forming film referred to, then a uniform light field (i.e. a light field without dark images) is directed through the transparency into the image-reducing projection system. The image on the transparency desirably could form an overlay image for an image projected through the image plane, such as an image originating on the face of the cathode ray tube referred to. The transparency image may, for example, be the outlines of a business form with spaces for the projected data from the face of the cathode ray tube directed at the appropriate location of the form involved, or it may be the outlines of a map through which a cloud pattern of a weather map for the projected data from the face of the cathode ray tube.

In accordance with another aspect of the invention, the source of the light field directed through the transparency when only the transparency image is to be recorded is a uniform light field on the face of the same cathode ray tube used to produce data images in the above described mode of operation of the invention. However, for best resolution, it is desirable to use a separate light source for this purpose.

The above described and other features of the invention will become apparent upon making reference to the specification to follow and the drawings.

DESCRIPTION OF DRAWINGS

FIG. 1 is a perspective view of a self-contained microform image producing unit with an imaging station for receiving hard copy or a transparency placed thereat, and a cabinet containing a cathode ray tube and an associated image-magnifying system for directing an image on the face of the cathode ray tube upwardly through the imaging station into an imaging reducing projection system of the self-contained unit;

FIG. 2A is a vertical sectional view through the imaging station of the apparatus shown in FIG. 1 and showing a movable, opaque, hard copy-receiving platform at the imaging station pivoted into a vertical position to expose a transparency-receiving plate therebeneath, and the cathode ray tube image-magnifying system directing a light field upwardly through a transparency at the imaging station into a image-reducing projection system in the self-contained unit;

FIG. 2A' is an enlarged, fragmentary, vertical sectional view through the support base of the self-contained unit and cathode ray tube-containing cabinet shown in FIG. 1 and illustrates the relationship of a Fresnel lens, a transparent plate spaced above the lens, a transparency supported on the transparent plate and a ground or frosted glass or synthetic plastic plate supported on top of the transparency to align the image on the transparency with the image projected from the cathode ray tube;

FIG. 2B is a fragmentary, vertical sectional view through the support base of the self-contained unit and cathode ray tube-containing cabinet shown in FIG. 1 to which is added a separate light source and light projecting system for directing a uniform light field through the transparency at the imaging station;

FIG. 3A is a plan view of the imaging station of the apparatus shown in FIG. 2 when a business-forming transparency overlay is positioned thereat;

FIG. 3B is a plan view of the imaging station of the apparatus shown in FIG. 2 when a weather image transparency overlay is positioned thereat;

FIG. 4 is a fragmentary sectional view through the imaging station showing a uniform light field projected through the transparency supported at the imaging station so that the image on the transparency is the only image projected by the light field;

FIG. 5 is a fragmentary sectional view through the imaging station showing an image-containing light field projected through the transparency supported at the imaging station so that the image on the transparency and the image of the light field are both projected by the light field;

FIG. 6 is a perspective view showing the manner in which the Fresnel lens is mounted on the cathode ray tube cabinet, with the self-contained unit 10 removed therefrom.

FIG. 7 is a detailed block diagram showing how the preferred form of the invention of FIGS. 1 and 2A records on any selected frame or frames of a microfiche film card the image on the face of a cathode ray tube, the image produced by light reflecting off of hard copy, or the image on a transparency;

FIG. 8 shows the location of microfiche film card position sensors diagrammatically shown in FIG. 7.

DESCRIPTION OF EXEMPLARY FORM OF INVENTION

The apparatus illustrated in FIG. 1 comprises a self-contained microform image-producing unit 10 adapted to be mounted upon the top 15a of a cathode ray tube containing cabinet 15. The self-contained unit 10 includes a housing 11 extending upwardly from a support base 11a which rests upon the cabinet top 15a. The housing 11 has at one end thereof a rasied hood-forming portion 19 spaced above a horizontal white opaque platform 17 at a hard copy-supporting imaging station at the top of the support base. The platform 17 is mounted upon an insert panel 18 which is replaceable by another similar panel having an immovable hard copy-receiving platform when the self-contained unit 10 is to be used only as a hard copy microform-producing unit. The hood 19 defines access openings 23a, 23b and 23c respectively at the front, rear and one side of the housing 11 through which openings the operator may pass hard copy or a transparency which is to be placed upon the platform 17. The platform 17 preferably forms a co-planar extension of the surrounding upper surfaces 18a of the panel 18 and support base 11a of the self-contained unit 10 so that the hard copy much larger than the size of the platform 17 can be easily positioned over the image field defined by the platform 17.

Projection lamps 16 supported upon the inside of hood-forming walls like 19a, 19b and 19c direct light down upon the hard copy placed on the platform 17. The lamps 16 may be fluorescent lamps which may be controlled in a manner like that disclosed in FIG. 2 of U.S. Pat. No. 4,158,253, granted June 19, 1979. The light reflected upward by the hard copy passes through an image-reducing projection system which may comprise mirrors 20 and 21 (FIG. 2A) which direct a reduced image through a lens 22 upon a light sensitive film 24, preferably a mask-forming film made of dry silver or other material, where the light-produced image thereon is developed by application of heat. The apparatus so far described is similar to that disclosed in said U.S. Pat. No. 4,123,157 except that the unit described in said patent did not have an insert panel 18 or a platform 17 designed to be moved away from its normal operative position.

The insert panel 18 also carries a horizontal transparent transparency-supporting plate 17' in an opening 26 thereof through which plate a light field can be projected upwardly into the image-reducing projection system through an opening 26' in the cabinet top 15a. The platform 17 normally rests upon the transparent plate 17' which fills the entire opening 26 and thus forms also a dust shield for preventing dust from dropping into the opening 26. The dimensions of opening 26 and the platform 17 and transparent plate 17' encompasses an area about equal to the largest area of hard copy which can be accommodated by the microform image-producing apparatus. As illustrated, the opaque platform 17 is mounted for pivotal movement from a horizontal position in the opening 26 to a vertical position where it passes into an opening 31a of a cowling 31 and engages a wall 31b thereof. The wall 31b has a magnet 31c which holds the platform 17 securely in a vertical position and carries a switch 31d which is operated into a position which permits a cathode ray tube or transparency imaging operation when the platform is raised into its neutral position. The platform 17 may be provided with a flexible tab 17b on its normally top surface thereof which can be grasped to lift the platform 17 from its horizontal position within the opening 26.

Referring now most particularly to FIG. 2A, a cathode ray tube 25 is mounted below the cabinet top 15a. While the cathode ray tube 25 could be mounted immediately below the opening 26 in the insert panel 18, which would require that the cathode ray tube be of a size similar to the opening 26, it is most advantageous to utilize a much smaller cathode ray tube positioned in the cabinet 15 remote from the opening 26. (This feature is a sole invention of Gerald Marshall.) To this end, the cathode ray tube face 25a is shown directed horizontally into an image-magnifying and projection system including a magnifying lens unit 28 opposite the cathode ray tube face 25a, and inclined mirror 28' and a Fresnel lens unit 28" mounted on the top surface 15a of the cabinet 15. This projection system focuses the image on the face of the cathode ray tube 25 in a document or object plane defined by the top surface of the platform 17 when it is in a horizontal position. The Fresnel lens unit 28" serves the purpose of converging the light rays projecting through the same so that a converging beam is directed to the mirror 20 shown in FIG. 2A.

Electrical connection between the cathode ray tube 25 and control circuitry within the self-contained unit 10 is directly or indirectly made through a connecting cable 27 or the like which extends between the cabinet 15 and the self-contained unit 10 (FIG. 1).

When it is desired to provide a microform image of hard copy, the platform 17 is dropped into its horizontal position within the opening 26 and hard copy is placed over this platform 17 wherein, upon operation of suitable manual controls to be described, the lamps 16 are energized momentarily to direct light upon the hard copy at the imaging station. When it is desired to record an image on the face of the cathode ray tube 25, the platform 17 is raised into the vertical position shown in FIG. 2A to expose the transparent plate 17' where, upon operation of manual controls to be described, an image appears on the face of a cathode ray tube 25 which is projected through the image-magnifying and projection system in the cabinet 15 into the image-reducing projection system in the self-contained unit 10. When an image on a transparency 29 is to be recorded, the transparency is placed on the transparent plate 17' in the opening 26. Where the image on the transparency 29 to be recorded is to be superimposed on the image projected from the cathode ray tube, a precise positioning of the transparency is required. This is accomplished in a manner shown in FIG. 2A' by placing on the transparency 29 a ground or frosted plate 17a whose outer surface 17a' is flush with the panel surface 18a that is in the document plane. The plate 17a acts as an image projection screen on which appears the superimposed image of the transparency 29 and the image projected from the cathode ray tube 25 which can be exactly focused thereon by adjusting the position of lens 28. Image-alignment can be achieved by shifting the transparency or cathode ray tube.

FIG. 3A shows a business form transparency 29A placed in the panel opening 26 upon the transparent plate 17', the transparency having spaces which will be filled in by the data projected through the transparency 29A from the cathode ray tube. FIG. 3B shows a transparency 29B having the outlines of geographical features like state lines which are to overlay an image projected from the face of the cathode ray tube 25, which may be a cloud pattern obtained from a satellite picture of the area involved. In these examples, the transparency 29 is illuminated by an image-containing light field, as shown diagrammatically in FIG. 5.

On the other hand, when it is desired to form a microform record of only the image on the transparency 29, the light field projected through the transparency plate will be a homogeneous light field, as shown in FIG. 4. Such a light field may be a homogeneous light field provided on the face of the cathode ray tube 25, as is the case in the form of the invention shown in FIG. 2A, or it may be a homogeneous light field produced by a separate light source and associated projection means to be described in connection with FIG. 2B to be described.

The Fresnel lens unit 28", a well-known type of lens element, is shown in FIG. 2A' and in FIG. 6. It is a transparent plate of even thickness which has a series of concentric sawtooth grooves thereon which convert the transparent plate into a lens. This lens unit 28" is positioned so that it will converge the light rays passing upwardly therethrough and focused in the document or image plane, which is the plane of the top surface of the platform 17 when the platform 17 is in its lowered position. The Fresnel lens unit 28" may be anchored in place on the cabinet top 15a in any suitable way. However, as illustrated, the Fresnel lens unit 28" sits on annular shoulders 33a of three dowels 33 which are spaced equally about the opening 26' in the cabinet top 15a. Each of the dowels 33 has a large cylindrical main body portion 22b defining an annular shoulder 33a, a downwardly extending cylindrical bottom end portion 33c rotatably mounted within an opening in the cabinet top 15a, and a cylindrical upper end portion 33d which is slightly eccentric with respect to the axis of the cylindrical bottom end portion 33c. When the Fresnel lens unit 28" is placed upon the annular shoulders 33a of the three dowels 33, the outer margin of the lens unit 28" will be close to the cylindrical upper end portions 33d. The lens unit 28" is then secured in place by rotating each of the dowels 33 a small amount so that the cylindrical upper end portions 33d of these dowels will tightly engage and clamp the lens unit 28" in place.

The advantage of using a relatively small cathode ray tube and an associated image magnifying and projection system including the lens units 28 and 28" rather than utilizing a large cathode ray tube positioned immediately below the opening 26 as disclosed in said co-pending application is that this makes possible the use of precise focusing of the image on the face of the cathode ray tube in the document plane and it provides a light field of a given intensity in this document plane at a much lower cost.

Referring now to FIG. 2B, where it is desired to record images of medical X-rays and other images requiring a high resolution, the form of the invention in FIG. 2B is of particular importance. Here, instead of producing a homogeneous light field from the cathode ray tube 25, this field is produced by a high intensity bulb, like a flashlight bulb 25A, mounted in front of a thin highly transparent plate 25B which is positioned to be in the path of the diverging light rays during the cathode ray tube imaging mode of operation of the recording system. The glass plate 25B, because of the high intensity small light source of the bulb 25A reflects a less intense but still substantially intense light image into the Fresnel lens unit 28". The lens unit 28 and the high intensity lamp 25a are located at conjugate points relative to the Fresnel lens unit 28".

The self-contained microform image-producing unit 10 is provided with a control panel 32 (FIG. 1) having various manually operable controls like those to be described in connection with the functional block diagram of FIG. 7. This control panel may include, for example, microfiche frame identifying keys which, when depressed, will effect movement of a selected frame of a microfiche film card upon which the ultimate image is to be formed into position for receiving an image. Also, it may have transparency, CRT and hard copy mode set-up keys and transparency, CRT and hard copy record keys respectively for setting up the recording system and effecting the recording of transparency, CRT or hard copy images on a microfiche film card. Also, the keyboard may contain add-on data controls to provide a projection on the platform of a selected imaged frame of the microfiche card involved so that a hard copy overlay may be placed on the platform 17 and the still unimaged portion of the microfiche card frame involved can be imaged from the hard copy overlay. Such add-on data controls are shown in said U.S. Pat. No. 4,123,157.

While the control circuit details of the exemplary preferred form of the invention being described can vary widely, it may have the circuit logic and other details shown in FIG. 7, to which reference should now be made. FIG. 7 shows the invention applied to an apparatus for producing microform records similar in many respects to that shown in said U.S. Pat. No. 4,123,157. Accordingly, such apparatus which is contained within the housing 11 includes, in addition to the mirrors 20–21 and lens 22, a masking film cassette and carriage assembly generally indicated by reference numeral 39. The assembly 39 includes a cassette 24' which may be identical to that disclosed in the latter patent, and so includes a supply and a motor-driven take-up reel for holding and positioning a roll of dry silver mask-forming film, which is periodically advanced in step-by-step fashion to an imaging position within the cassette. Also, the cassette carries a hold-down plunger and a heat developing plunger which are respectively brought down in succession upon the portion of the mask-forming film in position to press the same into a fixed plane as described in the latter patent, to carry out exposure and developing operations to produce a transparency for each image projected thereon. The hold-down plunger, heat developing plunger and mask-forming film supply and take up reels are respectively diagrammatically indicated by reference numerals 52, 54 and 56 respectively extending to the dotted box shown in the interior of the cassette shown in FIG. 7. The control means therefor respectively are diagrammatically illustrated in box form in FIG. 7 outside of the cassette (while they are obviously within the same) and identified respectively by reference numerals 52', 54' and 56'. When these control means receive operating control voltages on control lines identified by reference characters B, A and C respectively, the hold-down plunger will be depressed momentarily for a period equal to the largest expected exposure time, the heat developing plunger will be depressed for a proper period for developing the film and the motor controlling the positioning of the mask-forming film will advance the film an increment to bring a new area of the film into an imaging position.

The mask-forming film cassette and carriage assembly 39 is guided for movement upon one or more guide rods 40. The assembly 39 is initially positioned as shown in FIG. 7 opposite a film imaging and developing station 41. The assembly 39 may be spring urged into this position by spring return means 51. The assembly is moved against the return force of this spring return means by, for example, a pulley drive system including a chain or cord 42 connected to the assembly 39 and extending around pulley wheels 44 and 46. The pulley wheel 46 is driven by a motor 48 controlled by a motor control circuit 48' which becomes energized when an input line D thereof receives a start pulse and becomes de-energized when an input line 48a' thereof receives an "off" voltage generated by a limit switch 51 operated when the cassette 24' is moved to an image transfer station 43. The input line 48a' is also connected to a carriage latch input line 53a' extending to an "on" terminal of a carriage latch means 53 which latches the assembly 39 into position when it strikes the limit switch 51. When the cassette 24' is opposite transfer station 43 the image previously formed on the mask-forming film is transferred to the proper frame of a microfiche film card 42a' shown in FIG. 8 supported on a carriage 45. The carriage latch means 53 becomes de-energized to release the assembly 39 so it can return under the force of the spring return means 51 to the imaging and developing station 41 when the carriage latch means 53 receives an "off" pulse on an input line G. The position of the microfilm card carriage 45 is controlled by a carriage position control circuit 45' which receives signals from signal sources to be described. Mounted beneath the microfiche film card carriage 45 is a plunger 62 controlled by a solenoid 62' which, when energized momentarily, will bring the plunger 62 against the selected frame of the microfiche film card in position for imaging to press the same against the mask-forming film, in turn, braced by a suitable backing as described in said latter patent. When the plunger 62 is thus positioned, flash control circuit 58' will operate a xenon flash unit 58 or the like to provide a flash of light to transfer the image on the mask-forming film 24 to the frame of the microfiche film card on the carriage 45 in position for imaging.

There is at the image and developing station 41 a start position sensor 66 which is operated when the cassette 24' is opposite the imaging and developing station 41. At the image transfer station 43 there is provided an end of row sensor 70 which generates a control signal when the carriage 45 positions the microfiche film card so that the last frame in any row of frames thereof is in position for imaging, and an end of card sensor 72 which generates a control signal when the carriage 45 positions the microfiche film card so that the last frame of the last row of frames thereof is in position for imaging (see FIG. 8). An output line 72a of the end of card sensor 72 operates an indicator 72' to indicate to the operator that a new microfiche film card should be placed upon the carriage.

As previously indicated, the microform image-producing apparatus shown forms microform images on various frames of the microfiche film card from either hard copy placed upon platform 17, from an image produced on the face 25a of the cathode ray tube 25, and/or from a transparency 29 placed on the transparent plate 17'. The means for feeding images sequentially to a cathode ray tube from various data sources is well know in the art, (although the prior art has not incorporated the same into a microform imaging system as shown and described). These data sources feed this information one data page at a time either automatically or under manual control. The keyboard 30 may contain data source selection control keys 73 for manual selection of a data source, many of which are shown connected to switch means 73'. Control lines 73a are shown extending to a microprocessor control means 79, in turn, connected by control lines 73b to the switch means 73'. A selected data source feeds data to be converted into alpha-numeric or picture or curve producing form first to an input data readout storage means 74. The data storage means 74, in turn, is connected to cathode ray tube beam deflection control means 75 and image-producing intensity control means 76 which respectively control the position and intensity of an electron beam directed toward the screen on the face of the cathode ray tube 25. Suffice it to say, the deflection control means 75 and intensity control means 76 have output lines 75b and 76b upon which the proper deflection and intensity control signals appear, when no inhibiting signals are fed thereto. (Only intensity control means 76 is shown with an inhibit input terminal 76a.) The output line 76b of the intensity control means is shown coupled to an input terminal 84a of an "AND" gate 84 whose output line 84c connects to the terminal 25a of the cathode ray tube base controlling beam intensity. The rapidly changing signals on the output line 76b can pass through the "AND" gate 84 only when enable signals appear on the other input terminal 84b thereof. The connections to these other input terminals will be hereinafter described.

The signals generated by the image-producing intensity control means in conjunction with the signals generated by the deflection control means 75 produces the image-containing light field which is recorded on a frame of the microfiche card-forming film whether or not a transparency 29 is positioned on the transparent plate 17'. However, as previously indicated, when it is desired to record only an image on a transparency placed on the transparent plate 17', in accordance with the form of the invention shown in FIG. 2A, a homogeneous light field is generated on the face of the cathode ray tube 25. To this end, an intensity control means 76' is provided which, as illustrated in FIG. 7, is an "AND" gate 76' having an input terminal 76a' to which is connected a continuous source of voltage, an input 76b' extending to the control means 79 so that an enable signal appears on this terminal when a transparency-only set-up record key 87 is operated, and an input terminal 76c' which receives an enable signal for a period depending upon the exposure requirements of the film as determined by the intensity of the light produced on the face of the cathode ray tube 25. The "AND" gate 76' has an output terminal 76d' connected to the intensity control terminal 25a of the cathode ray tube terminal 76c' receives an enable signal when transparency-only record key 89 is operated when platform 17 is raised.

The transparency-only set-up key 87 is shown connected to the control means 79 through a control line 87a so that the control means 79 will generate on a control line 87b extending to the input terminal 76b' of "AND" gate 76' an enable signal which enables the beam-on producing signal on input terminal 76a' to be fed to the cathode ray tube terminal 25a for the length of time during which the cathode ray tube face is to be struck by the cathode ray tube beam. When the transparency-only set-up key 87 is operated, the signal on the control line 87a will also effect the generation by the control means 79 of an inhibit signal on a line 78 coupled through the rectifier 78' to the inhibit input signal 76a of the image-producing intensity control means 76 and the inhibit input of the data input storage means 74 so that no image-producing signal will be fed to the CRT during a transparency-only mode of operation of the apparatus shown in FIG. 7. Operation of the transparency-only record key 89 with platform 17 raised feeds a control signal on a control line 89a extending to the control means 79 which will effect the generation of a beam turn-on control signal in a line 97a extending to the input terminal 76c' of "AND" gate 76' in a manner to be described.

When the microfiche frame identifying keys 86 are depressed, or when microfiche frame address signal are generated by data storage means 74, groups of control lines collectively identified by 86a or 74a extending to control means 79 effect the generation of control signals on control lines 86b and 86c respectively extending to the set inputs of frame and row counters 96 and 98, which cause entry therein of the microfiche film card frame and row identifying indicia of the keys depressed. However, first signals fed from the control means 79 on control line 86b' reset the frame and row counters by the connection of reset line 86b' to the reset inputs of these counters. The frame and row counters 96 and 98 are respectively connected to the X and Y inputs of the carriage position control circuit 45' which effects the movement of the microfiche card carriage 45 into a position to bring the selected frame into image transferring position below the flash unit 58 when the circuit 45' receives a signal from a D input line. The frame counter 96 has an advance input terminal 96a to which extends line 58a connected to the output of the flash control circuit 58', so that the frame number stored in the frame counter increases by one digit automatically each time a new image is recorded on the microfiche film card 45a'. The frame counter resets to number 1 when the last frame in any row receives an image thereon.

Similarly, the row counter 98 has an advance input terminal 98a to which extends a control line 70a connected to the end of row sensor 70. Accordingly, each time the last frame in a row is imaged, the end of the row sensor 70 will be operated to advance the indicia in the row counter one row position, so that the next recording operation will take place in the first frame of the next row, unless a different frame number is set-up by the microfiche frame identifying keys 86.

When the CRT record mode set-up key 88 is operated, a control line 88a extending to the control means 79 effects the generation of an enable signal on a control line 88c extending to the input terminal 95b of a "AND" gate 95 having another input terminal 95c connected to output line 99a of a light intensity sensor 99, which senses the background light intensity of the image directed upon the mirror 21. The "AND" gate 95 also has an input terminal 95a connected to an input line B which receives a control signal at the appropriate time to effect the transfer of the signal generated by the light intensity sensor 99 to an input terminal of a CRT on-time control circuit 97 which generates a pulse having a width inversely proportional to the intensity of the light received by the light intensity sensor 99. The control pulse appears on an output line 97a of on-time control circuit 97 which line is connected to the input terminal 84b of the "AND" gate 84 the other input of which is coupled to the image control means 76, so that the intensity control terminal of the cathode ray tube 25 will receive sequences of the image-forming signals for a sufficient time period to provide the proper exposure of the mask-forming film 24. (Instead of using the output of control circuit 97 to control the length of time the data page image is present on the screen of the cathode ray tube, this output can control instead the temperature of the down time of the heat plunger to control the developing conditions of the mask-forming film.) The output line 97a of on-time control circuit 97 is also coupled to the input terminal of "AND" gate 76' to control the time the homogeneous light field produced by the cathode ray tube 25 during a transparency-only record mode of operation of the recording system being described.

The output line 99a of light intensity sensor 99 is also connected to an input terminal 103a of an "AND" gate 100 whose output line extends to a lamp exposure control circuit 102 which generates a pulse having a width inversely proportional to the intensity of the light detected by the light intensity sensor 99. However, the width of the pulse produced by the lamp exposure control circuit 102 will generally be different from the width of the pulse generated by the CRT on time control circuit 97 for a given light intensity striking the light intensity sensor 99 becase these pulses control different light producing sources, namely the lamps 16 and the light on the face of cathode ray tube 25. Accordingly, when the hard copy mode set-up key 90 is operated, the control line 90a extending from the key 90 to the control means 79 will result in the generation of an enable signal on a control line 90d extending to the input terminal 100b of the "AND" gate 100 which permits the opening thereof by a timing signal on input line B which controls the on-time of the lamps 16. (However, instead of using the output of lamp exposure control circuit 102 to control the on-time of lamp 18 the lamps can be turned on for a fixed period and this output can instead control the temperature as down time of the heat plunger to control the developing condition of the mask-forming film.)

However, as illustrated, the voltage sources for the lamps 16 include a standby voltage source 105 which provides only a low degree of energization of the lamps 16, so that no appreciable visible light is produced thereby, and a fully-on voltage source 108 which produces a voltage which will fully energize the lamps 16. The output voltages of the voltage sources 105 and 108 respectively are connected by lines 105a and 108a to input terminals 103b and 104c of "AND" gates 103 and 104, respectively. When the hard copy record mode set-up key 90 is depressed, enable signals appear on control lines 90c and 90e respectively extending to input terminals of "AND" gates 103 and 104 to enable the same to pass the voltages fed thereto from the respective voltage sources 105 and 108. Isolating rectifiers 107 and 109 respectively are connected between the outputs of the "AND" gates 103 and 104 and a common line 18a extending to the lamps 16.

In the preferred form of the invention, the image-producing light field produced on the cathode ray tube face comprises backlighted areas surrounding dark data indicating areas so that the cathode ray tube image appears like a hard copy image. This permits the use of the same light intensity sensor 99 located to interrupt a corner portion of the image field which will always be a lighted portion. Also, such a cathode ray tube image permits data to be added onto the image produced on the microfiche card-forming film because the backlighted portion of the cathode ray tube image produces no modification of the originally opaque portion of this film. Also, it was unexpectedly found that the exposure time needed for a given light intensity on the screen of a cathode ray tube is substantially less when the alpha-numeric or other data thereon are dark rather than lighted portions thereof. It is believed that this is due to the fact that the application of a narrow intensity turn-on voltage pulse to the intensity control terminal of a cathode ray tube to produce the small lighted areas does not have an instantaneous effect in bringing up the light intensity to a given desired value, and so the light intensity produced thereby gradually increases with time and so there is produced a much lower average light intensity than that produced by consistant voltage signals producing backlighted areas on the cathode ray tube screen. Also, if an attempt is made to increase the average intensity of small lighted data forming areas on the screen, the resolution of the image produced is adversely affected.

It is apparent that the logic of the circuit shown in FIG. 7 will prepare the recording system shown for a proper exposure of the mask-forming film 24 whether CRT, transparency-only or hard copy imaging mode of operation is demanded by operation of the proper set-up and record keys.

When the hard copy record mode set-up key 90 is operated, a continuous inhibit signal appears on line 87b extending to the "AND" gate 76' and on line 78 connected through an isolating diode 78' to the inhibit input terminals 74a and 76a of the buffer storage means 74 and image-producing intensity control means 76, until the CRT record start key 94 or transparency-only record key 89 is operated, so that no beam intensity-on signals are fed to the cathode ray tube 25 until the key 94 or 89 is operated and the masking film cassette 24' is at the imaging and developing station 41. Operation of the CRT record start key 94 or transparency-only record key 89 will not result in any recording operation unless the platform-operated switch 31d is operated by the raising of platform 17. To this end, the switch 31d is shown connected to control means 79 which inhibits any action of keys 89 or 94 unless the switch 31d is so operated.

When the CRT record start key 94 is depressed, the signal appearing on a line 94a extending from this key to the control means 79, as previously explained, results in the removal of an inhibit signal from inhibit line 78 so that computer stored data to be recorded on microfiche film card 42a' will be fed via a line 93 extending from the output of the computer data readout buffer storage means 74 and connected to the input terminal 111a of an "AND" gate 111, to provide a cycle start signal each time data for a new image on the face of cathode ray tube 25 is to be produced.

When the hard copy record key 92 is depressed, the signal appearing on the control line 92a extending to control means 79 initiates an enable signal on a control line 92b extending from the control means 79 to the input terminal 111a of "AND" gate 111. When the transparency-only record key 89 is operated, the control means 79 also generates an enable signal on control line 92b. The "AND" gate 111 has a second input terminal 111b which is connected by line 113 to the start position sensor 66 which produces an enable signal for "AND" gate 111 when the masking film cassette is positioned at the imaging and developing station 41, and an inhibit signal at all other times coupled through insulating diode 113' to the inhibit input terminals 74a and 76a of the buffer storage means 74, deflection control means 75 and intensity control means 76. It is thus apparent that the "AND" gate 111 will supply an output when the masking film cassette is in a proper position and either the hard copy or transparency-only record key 92 or 89, or the CRT record start key 94 has been previously depressed and there is data in buffer storage means 74 to be recorded. The appearance of a signal at the output of "AND" gate 111 then is fed to the input 108a of an imaging cycle control means 115 which, when triggered into operation by a signal at input terminal 108a, results in the sequential appearance of control signals at appropriate times at the various output lines A, B, C, D, E, F and G leading to various parts of the circuit shown in FIG. 7.

The imaging cycle control means 115 may be any suitable timing unit which generates various control pulses on said output lines A–G, the alphabetic characters indicating the relative time the various control signals are initiated. Thus, first the image cycle control means 115 generates a control pulse on its output line A which extends to the mask film strip feed control means 54' to advance the mask-forming film so that an unimaged frame thereof is positioned for imaging. Next, the control means 115 generates a control signal on its output line B which line extends to the hold-down plunger control means 52' and the input terminals 95a and 100c controlling the feeding of the output of light intensity sensor 99 to lamp and CRT exposure control means 97 and 102. The control means 97 and 102 may be operable slightly after the initiation of the control signal on output line B, so that movement of the hold-down plunger against the mask-forming film 24 will be completed before exposure of the film is initiated. These control signals will last for the period necessary to complete the longest anticipated exposure.

Next, the image cycle control means 115 generates a control pulse on output line C which extends to the heat plunger control means 56' which moves a heated plunger against the exposure frame of the mask-forming film to develop the same. The image cycle control means 115 then generates a control pulse on output line D extending to the motor control circuit 48' which pulse initiates the energization of motor 48, and to the carriage position control circuit 45' which then positions the microfiche card carriage 45 in accordance with the input signals fed to the "X" and "Y" inputs of the control circuit 45'. Next, the image cycle control means 115 generates a control pulse on output line E extending to the plunger selonoid 62' which move plunger 62 against the frame of the microfiche film card 45a' in position for imaging at the image transfer station 43. Manifestly, the control pulse on output line E is not initiated until the microfiche film cassette 24' has reached the limit switch 51 at the image transfer station 43 and the microfiche card carriage 45 has positioned the selected microfiche card frame in an imaging position.

Next, the image cycle control means 115 generates a pulse on its output line F which extends to the flash control circuit 58' to initiate energization of the flash unit 59 which then images the frame of the microfiche film card in position for imaging through the previously imaged frame of the mask-forming film 24. The image cycle control means 115 then generates a carriage return pulse on output line G which is shown extending to the carriage position control circuit 45' to release the carriage to return to its initial or home position as in the case of the carriage positioning means in said U.S. Pat. No. 4,123,157. The output line G also extends to the "off" terminal of the carriage latch means 53 so that the carriage latch is released over the spring return means 51 can return the microfilm cassette and carriage assembly 39 to a position where the cassette is adjacent to the start position sensor 66 at the image and developing station 41. When the cassette 24' is opposite the start position sensor 66, an associated indicator 66' becomes energized to indicate that a new imaging operation may take place.

While not shown in FIG. 7, as previously indicated, the apparatus of the present invention most advantageously carries out additional functions also performed by the apparatus disclosed in said U.S. Pat. No. 4,123,157 to enable the user to add information on unimaged portions of a partially imaged frame of the microfiche card-forming film 45a'. Thus, the keyboard 32 will include additional controls for effecting such an add-on operation which requires that the microfiche card carriage be moved into a position where a projection lamp will project a selected frame of the microfiche card-forming film onto the platform 17 so that a overlay sheet of hard copy can be positioned upon still unimaged portions of the selected frame. Then, an imaging operation of this overlay sheet is effected in the manner described to transfer data on the overlay sheet of hard copy onto a previously unimaged portion of the mask-forming film and then to transfer this image onto the microfiche card frame involved. As previously indicated, to effect this add-on capability from data images originally made from cathode ray tube 25 must be formed by dark backlighted areas thereof duplicating the appearance of hard copy. While hard copy-duplicating images may have been previously displayed on the screens of cathode ray tubes, it is not believed that such images have been used in the formation of microform images or for the purpose of giving a microform recording system an add-on capability. It should be noted that because a microfilm like dry silver film is affected by the background lighted portions of the hard copy image, there can be no data added thereto once it is imaged.

It is thus apparent that applicants have provided the highly unique and advantageous microform recording apparatus for various types of data sources, such as hard copy, cathode ray tube image and transparency sources. In the case of the transparency, for example, the transparency could be x-ray films or other image sources which are to be recorded by themselves on a selected frame of the microform film involved. In the case where the transparencies are overlays to an image, for example, projected from the face of a cathode ray tube, such transparencies may be business forms, maps, and the like upon which other images are to be projected in the recording operation.

It should be understood that numerous modifications may be made in the most preferred form of the invention without deviating from the broader aspects thereof. For example, while the use of a non-archival mask-forming film like dry silver is most advantageously used to form the image produced by the projection system and this image is then transferred to an add-on dry process archival film like the dispersion film disclosed in said U.S. Pat. Nos. 3,966,317 and 4,123,157, the reduced projected image may be transferred directly to the ultimate microfilm to be used as the permanent final microfilm recording medium. Additionally, while the cathode ray tube is the most preferred source of an image-containing light field as described, other light sources which project images can be utilized instead as the sources of such light fields.

I claim:

1. In an apparatus for producing microform records from light reflecting hard copy wherein a light image reflected from the hard copy is reduced to micro-image size and applied at a film imaging station to film means which is photosensitive to an image by the light reflecting hard copy, said apparatus including a hard copy-supporting station including a generally horizontal, opaque, hard copy-supporting platform, lighting means mounted above said platform which lighting means is to be energized when a record of a piece of hard copy placed on said platform is to be made, an image-receiving and projecting means for receiving hard copy reflected light from a piece of hard copy placed on said platform and for providing a micro-image thereof directed upon said film means, the improvement wherein said platform is mounted for movement between an operative horizontal position at said supporting station and a position removed therefrom, a transparent plate provided at said supporting station exposed when said platform is removed therefrom for placement of a transparency thereon, and light field producing means for projecting upwardly through said transparent plate and into said image-receiving means selectively a uniform light field where the image on the transparency is to be the only image to be recorded on said film means or an image-containing light field where the image on said transparency is to be superimposed upon the image of said image-containing light field.

2. The apparatus of claim 1 wherein said image-receiving and projecting means is located above said hard copy-supporting station and said light field producing means is located below the same for projecting said light fields upwardly through said transparent plate and into said image-receiving means thereabove.

3. The apparatus of claim 2 wherein said platform in its operative position is located above said transparent plate.

4. The apparatus of claim 3 wherein said platform is pivotally mounted for movement between said horizontal operative position and a vertical position above said transparent plate.

5. The apparatus of claim 1 wherein said transparent plate is located below the top of a recess normally covered by said platform in the operative position thereof, and wherein movement of said platform exposes said transparent plate and exposes the defining walls of said recess within which said transparency may then be placed.

6. In an apparatus for producing microform records from light reflecting hard copy wherein a light image reflected from the hard copy is reduced to micro-image size and applied at a film imaging station to film means which is photosensitive to an image by the light reflecting hard copy, said apparatus including a hard copy-supporting station including an opaque hard copy-supporting platform and image-reducing projection means for directing upon said film means a micro-image of the light reflected image from hard copy placed on said platform, the improvement wherein there is provided a transparency supporting station including transparency-supporting means and means for directing through a transparency on said supporting means and into said projection means a light field which projects the image on said transparency upon said film means, said light field directing means being a cathode ray tube, and means for energizing said cathode ray tube to provide a light field on the screen thereof which is projected through said transparency-supporting means into said projection system.

7. The apparatus of claim 6 wherein said energizing means produces a uniform light field on the screen of said cathode ray tube.

8. The apparatus of claim 6 wherein said energizing means produces a light field on the screen of said cathode ray tube which forms a page of data to be recorded on said film means.

9. The apparatus of claim 8 wherein there is provided at said transparency supporting station an image-producing transparency forming an image overlay superimposed on the image projected from said cathode ray tube screen into said film means by said image-reducing projection system.

10. The apparatus of claim 6 wherein said hard copy-receiving platform is movable into and out of a hard copy supporting position, and said hard copy imaging and transparency-supporting stations being one and the same station, said transparency-supporting means being adjacent to the surface of said platform which supports said hard copy when the platform is in a hard copy supporting position.

11. The apparatus of claim 6 or 10 wherein said transparency-supporting means is a horizontal transparent plate through which said light field is directed upwardly through a transparency placed upon said plate into said projection system, and said hard copy-supporting platform is a horizontal platform upon which hard copy is placed so that light reflected down upon said hard copy is reflected up into said projection system.

12. In an apparatus for producing microform records including an image-receiving and projection means for receiving light images and for providing a micro-image thereof directed upon said film means, the improvement comprising a transparency-supporting station including transparency-supporting means and means for directing through a transparency on said supporting means and into said projection means a light field which projects the image on said transparency upon said film means, said light field directing means being a cathode ray tube, and means for energizing said cathode ray tube to provide a light field on the screen thereof which is projected through said transparency-supporting means into said image-receiving and projection means.

13. The apparatus of claim 12 wherein said energizing means produces a uniform light field on the screen of said cathode ray tube.

14. The apparatus of claim 12 or 13 wherein there is provided at said transparency supporting station an image-producing transparency forming an image overlay superimposed on the light field projected from said cathode ray tube screen onto said film means by said image-receiving and projection means.

15. The apparatus of claim 12 or 13 wherein said transparency-supporting means is a horizontal transparent plate through which said light field is directed upwardly through a transparency placed upon said plate.

16. In an apparatus for producing microform records said apparatus including an image-receiving and projecting means for receiving light-defined images and for providing a micro-image thereof directed upon film means, the improvement comprising a transparent transparency support means facing said image-receiving means and provided for placement of a transparency thereon, an image-containing transparency on said support means, and light field producing means on the opposite side of said support means facing said image-receiving means for selectively projecting through said transparency support means and the transparency thereon and into said image-receiving means a uniform light field where the image on the transparency is to be the only image to be recorded on said film means or an image-containing light field where the image of said image-containing light field is to be superimposed upon the image of said transparency.

17. The apparatus of claim 12 wherein said energizing means selectively provides a uniform or an image-containing light field on the screen of said cathode ray tube.

* * * * *